Figure 1:
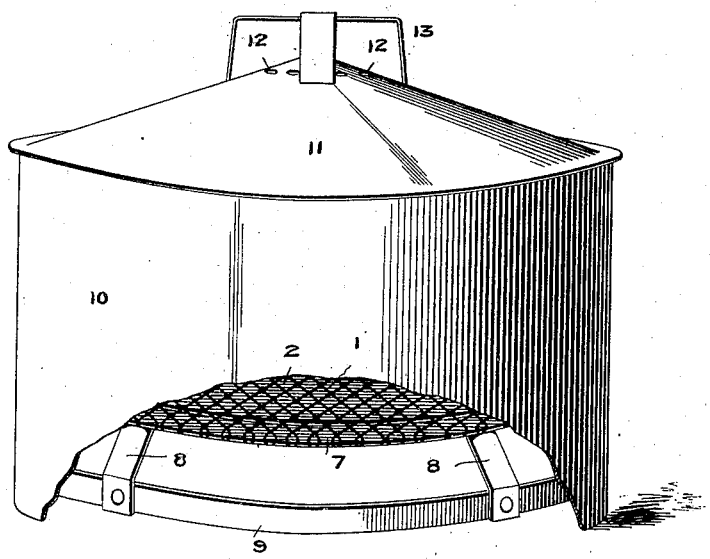

No. 654,539. Patented July 24, 1900.
R. W. HILLIKER.
BAKE OVEN FOR GAS OR GASOLENE STOVES.
(Application filed Aug. 24, 1899.)
(No Model.)

Witnesses

Inventor
Ryerson W. Hilliker
by
Attorneys

UNITED STATES PATENT OFFICE.

RYERSON W. HILLIKER, OF KANSAS CITY, KANSAS.

BAKE-OVEN FOR GAS OR GASOLENE STOVES.

SPECIFICATION forming part of Letters Patent No. 654,539, dated July 24, 1900.

Application filed August 24, 1899. Serial No. 728,345. (No model.)

*To all whom it may concern:*

Be it known that I, RYERSON W. HILLIKER, a citizen of the United States, residing at Kansas City, in the county of Wyandotte and State of Kansas, have invented certain new and useful Improvements in Bake-Ovens for Gas or Gasolene Stoves; and I do declare the following to be a full, clear, and exact description of the invention, such as will enable others skilled in the art to which it appertains to make and use the same.

My invention relates to improvements in detachable bake-ovens for gas and gasolene stoves, and the object is to provide a simple, inexpensive, and efficient device for this purpose.

To this end the invention consists in the construction, combination, and arrangement of the several elements of the device, as will be hereinafter more fully described, and particularly pointed out in the claims.

In the accompanying drawings the same reference characters indicate the same parts of the invention.

Figure 2:
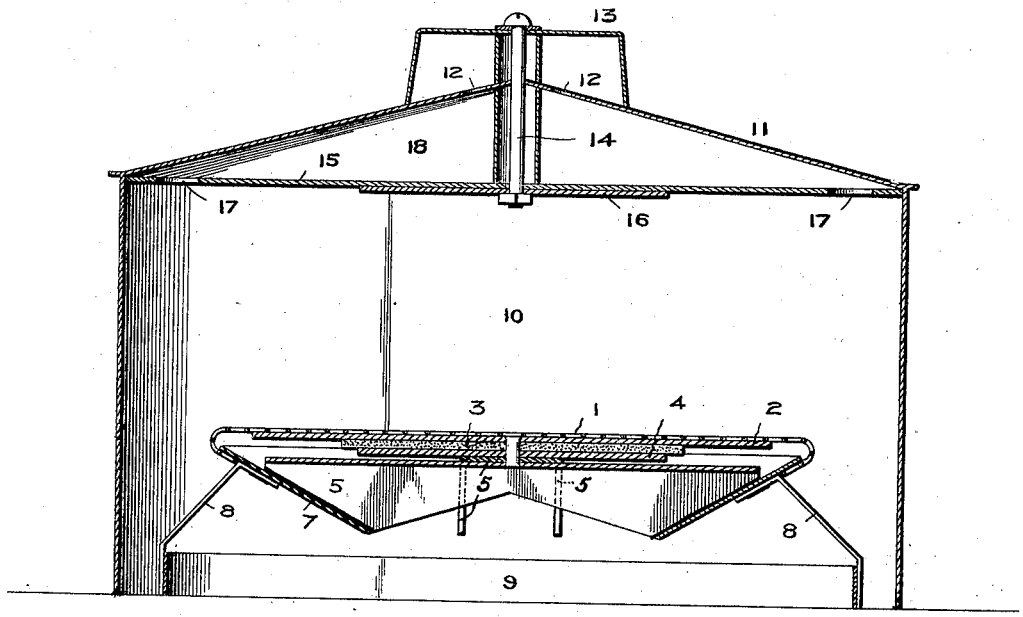

Figure 1 is a perspective view of my improved oven with a portion of the hood broken away to show the interior or base of the oven. Fig. 2 is a vertical transverse section of the oven.

The support or shelf on which the article to be cooked is placed consists of a reticulated platform 1, resting on a sheet-metal disk or plate 2, which in turn rests upon an asbestos sheet 3, supported by a metal plate 4, secured to the radial cross-braces 5 5 by the central rivet 6. These braces each has parallel side flanges, the edges of which at their outer ends are cut on an incline to conform to the concave shape of the deflector-collar 7, the lower or convex surface of which is provided with depending legs 8 8, which in turn are secured to the annular foot-rail 9. The outer edge of the collar 7 is somewhat longer than the plate 2, so as to leave an annular heat-passage between the plate and collar, and these two members are held in this relative position by turning the outer edge of the reticulated platform under and clamping it around the collar 7.

10 denotes the hood or oven proper, formed with a dome-shaped top 11, having a series of heat-outlet orifices 12, and a handle 13, which is secured thereto by a bolt 14, which passes through the diaphragm 15 and the reinforcing-plate 16. The diaphragm 15 is provided with the orifices 17, through which the heat from the oven passes into the chamber 18, and thence into the atmosphere through the orifices 12.

The device is placed over the flame of a gas or gasolene stove, and the deflector-collar spreads the flame and prevents its concentrating too strong under the article. In toasting bread and the like the hood is not required, as the bread is simply placed on the wire platform to secure the best results—a brown toast without burning.

It will of course be understood that various changes in the form, proportion, and the minor details of construction may be resorted to without departing from the principle or sacrificing any of the advantages of this invention.

Having thus fully described my invention, what I claim as new and useful, and desire to secure by Letters Patent of the United States, is—

1. The combination with a suitably-supported concave deflector-collar; of metal plates supported upon said collar, an asbestos sheet interposed between said metal plates, braces interposed between the lowermost metal plate and the concave collar and serving to deflect the products of combustion toward the outer edge of said collar, said metal plates, asbestos sheet and braces being riveted together, substantially as and for the purpose set forth.

2. The combination with a suitably-supported concave deflector-collar; of metal plates supported upon said collar, an asbestos sheet interposed between said metal plates, braces interposed between the lowermost metal plate and the concave collar and serving to deflect the products of combustion toward the outer edge of said collar, said metal plates, asbestos sheet and braces being riveted together, and a reticulated platform the edges of which are bent around the edges of the upper metallic plate and the concave collar, substantially as and for the purpose set forth.

In testimony whereof I have hereunto set my hand in presence of two subscribing witnesses.

RYERSON W. HILLIKER.

Witnesses:
W. C. WOOD,
N. COSSMAN.